United States Patent
Ko et al.

(10) Patent No.: US 8,493,455 B2
(45) Date of Patent: Jul. 23, 2013

(54) LENS ASSEMBLY ALIGNMENT DEVICE FOR CAMERA LENS MODULE

(75) Inventors: Kil-Soo Ko, Suwon-si (KR); Doo-Sik Shin, Suwon-si (KR)

(73) Assignee: Samsung Electronics Co., Ltd (KR)

(*) Notice: Subject to any disclaimer, the term of this patent is extended or adjusted under 35 U.S.C. 154(b) by 624 days.

(21) Appl. No.: 12/705,254

(22) Filed: Feb. 12, 2010

(65) Prior Publication Data

US 2010/0205793 A1 Aug. 19, 2010

(30) Foreign Application Priority Data

Feb. 16, 2009 (KR) ........................ 10-2009-0012402

(51) Int. Cl.
*H04N 5/228* (2006.01)

(52) U.S. Cl.
USPC ............... 348/208.99; 348/208.11; 348/190; 396/55; 29/282; 29/271; 29/759

(58) Field of Classification Search
USPC ............. 29/285.1, 281.6, 282, 283, 271, 272, 29/407.04, 743, 759; 396/55; 348/208.11, 348/190, 208.99; 901/16; 361/730
See application file for complete search history.

(56) References Cited

U.S. PATENT DOCUMENTS

| | | | | |
|---|---|---|---|---|
| 4,490,202 A | * | 12/1984 | Dumont | 156/166 |
| 5,351,334 A | * | 9/1994 | Chun et al. | 385/134 |
| 5,453,606 A | | 9/1995 | Hojo | |
| 5,455,765 A | * | 10/1995 | Pryor | 700/62 |
| 5,636,425 A | * | 6/1997 | Best | 29/407.04 |
| 5,868,485 A | * | 2/1999 | Fujimori et al. | 353/119 |
| 5,969,798 A | * | 10/1999 | Nakagawa et al. | 355/52 |
| 6,163,946 A | * | 12/2000 | Pryor | 29/407.04 |
| 6,167,607 B1 | * | 1/2001 | Pryor | 29/407.04 |
| 6,301,763 B1 | * | 10/2001 | Pryor | 29/407.04 |
| 6,320,706 B1 | * | 11/2001 | Richard et al. | 359/822 |
| 6,602,089 B2 | * | 8/2003 | Abe et al. | 439/404 |
| 6,891,608 B2 | * | 5/2005 | Byer et al. | 356/153 |
| 7,193,728 B2 | * | 3/2007 | Ichikawa et al. | 356/614 |
| 7,253,443 B2 | * | 8/2007 | Yoshida et al. | 257/80 |
| 7,694,135 B2 | * | 4/2010 | Rowan et al. | 713/166 |
| 7,804,645 B2 | * | 9/2010 | Morita et al. | 359/554 |
| 7,893,965 B2 | * | 2/2011 | Heim et al. | 348/208.99 |
| 8,174,583 B2 | * | 5/2012 | Ko et al. | 348/208.7 |
| 2004/0027586 A1 | * | 2/2004 | Ichikawa et al. | 356/614 |
| 2007/0086016 A1 | * | 4/2007 | Carlson | 356/491 |

FOREIGN PATENT DOCUMENTS

| | | |
|---|---|---|
| JP | 6-265766 | 9/1994 |
| KR | 1020060087666 | 8/2006 |
| KR | 1020080055725 | 6/2008 |

* cited by examiner

*Primary Examiner* — Joshua J Michener
*Assistant Examiner* — Chi Q Nguyen
(74) *Attorney, Agent, or Firm* — The Farrell Law Firm, P.C.

(57) ABSTRACT

A lens assembly alignment apparatus for a camera lens module is provided. The lens assembly alignment apparatus includes a position alignment apparatus that moves a lens assembly in a direction of an optical axis of the lens assembly and on a plane perpendicular to the optical axis. The apparatus also includes a slant alignment apparatus having first and second rotary axes which extend perpendicular to each other and perpendicular to the optical axis of the lens assembly, respectively. The lens assembly is received in a housing, and the slant alignment apparatus aligns an optical axis of an image sensor, which is mounted in the housing, parallel to the optical axis of the lens assembly by rotating the housing about each of the first and second rotary axes.

7 Claims, 7 Drawing Sheets

LENS ASSEMBLY ALIGNMENT DEVICE FOR CAMERA LENS MODULE

PRIORITY

This application claims priority under 35 U.S.C. §119(a) to an application entitled "Lens Assembly Alignment Device For Camera Lens Module" filed in the Korean Intellectual Property Office on Feb. 16, 2009 and assigned Serial No. 10-2009-0012402, the content of which is incorporated herein by reference.

BACKGROUND OF THE INVENTION

1. Field of the Invention

The present invention relates generally to a camera lens module, and more particularly, to a lens assembly alignment device for aligning the optical axis of the lens assembly with the optical axis of an image sensor when mounting the lens assembly in a camera lens module.

2. Description of the Related Art

A digital camera converts an image signal into an electric signal, and thereby electrically executes all signal processing, such as recording, reproducing, etc. The digital camera does not require a darkroom processes or chemical treatments like a silver salt film camera. The digital camera also allows for immediate confirmation of a photographed image. Additionally, recorded image information is electronically processed so that it can be post-treated or remotely transmitted through a computer. Therefore, expectations for and interest in image devices are concentrated on digital cameras.

Recently, camera lens modules digital cameras have been provided in portable terminals, thereby extending the application of digital cameras. Since image sensor techniques have been greatly improved, a camera lens module that performs in the same manner as a digital camera is able to be provided in a portable terminal. As a result, portable terminals that are equipped with a lens module have made inroads into digital camera markets.

Camera lens modules are miniaturized so that they can be incorporated into a portable terminal. Additionally, the camera lens modules are preferably manufactured in a structure that allows the camera lens modules to properly exhibit their performance even when miniaturized. The performance of a camera lens module is determined by the quality and performance of individual optical elements thereof, for example by the performance of an image sensor and the quality of a lens. However, if the optical axes of the image sensor and the lens are not properly aligned with each other, the performance of the camera lens module is deteriorated even when the performance and quality of its individual optical elements are excellent.

Since camera lens modules that are provided in a conventional portable terminal have only provided a photographing function, the quality of photographed images has been controlled by managing manufacturing tolerances and assembling tolerances of parts utilized for assembling an image sensor and a lens without precisely aligning the optical axes of the image sensor and the lens. As the use of portable terminals has become more popular and the required performance of optical elements, such as image sensors, has increased, there is a greater importance in aligning optical axes of image sensors and lenses since portable terminals equipped with a camera lens module have substituted for compact digital cameras.

The performance of optical elements, such as image sensors, that constitute camera lens modules and are to be equipped not only in a digital camera but also in a portable terminal, have been greatly improved. However, proper alignment between optical elements has not been yet been provided in camera lens modules equipped in an information device, such as a portable terminal. Thus, even if a camera lens module is configured with high performance and high quality optical elements, there is a limit in improving the quality of photographed images of the camera lens module.

SUMMARY OF THE INVENTION

The present invention has been made to address at least the above problems and/or disadvantages and to provide at least the advantages described below. Accordingly, an aspect of the present invention provides an alignment device which can readily align optical axes between optical elements for a camera lens module.

Another aspect of the present invention provides an alignment device which is capable of executing the alignment of optical axes between optical elements even in a camera lens module to be equipped in an information device, such as a portable terminal, thereby optimizing the performance of the individual optical elements provided in the camera lens module.

A further aspect of the present invention provides an alignment device which is capable of executing the alignment of optical axes between optical elements in a camera lens module, thereby contributing to the improvement of quality of photographed image of the camera lens module.

According to one aspect of the present invention, a lens assembly alignment apparatus for a camera lens module is provided. The apparatus includes a position alignment apparatus that moves a lens assembly in a direction of an optical axis of the lens assembly and on a plane perpendicular to the optical axis of the lens assembly. The apparatus also includes a slant alignment apparatus having first and second rotary axes which extend perpendicular to each other and perpendicular to the optical axis of the lens assembly, respectively. The lens assembly is received in a housing, and the slant alignment apparatus aligns an optical axis of an image sensor, which is mounted in the housing, parallel to the optical axis of the lens assembly by rotating the housing about each of the first and second rotary axes.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. In the following description, the same or similar elements may be designated by the same or similar reference numerals although they are shown in different drawings. Further, various specific definitions found in the following description, such as specific values of packet identifications, contents of displayed information, etc., are provided only to help general understanding of the present invention, and it is apparent to those skilled in the art that the present invention can be implemented without such definitions. Detailed descriptions of constructions or processes known in the art may be omitted to avoid obscuring the subject matter of the present invention.

As shown in FIGS. 1 to 5, a lens assembly alignment device 200 for a camera lens module, according to an embodiment of the present invention, includes a position alignment apparatus 201 and a slant alignment apparatus 202. A lens assembly is fixed to a housing 102 of a camera lens module 100 using a welding unit after the alignment of the lens assembly is completed.

The construction of the camera lens module 100 is first described with reference to FIGS. 6 and 7.

Figure 1:
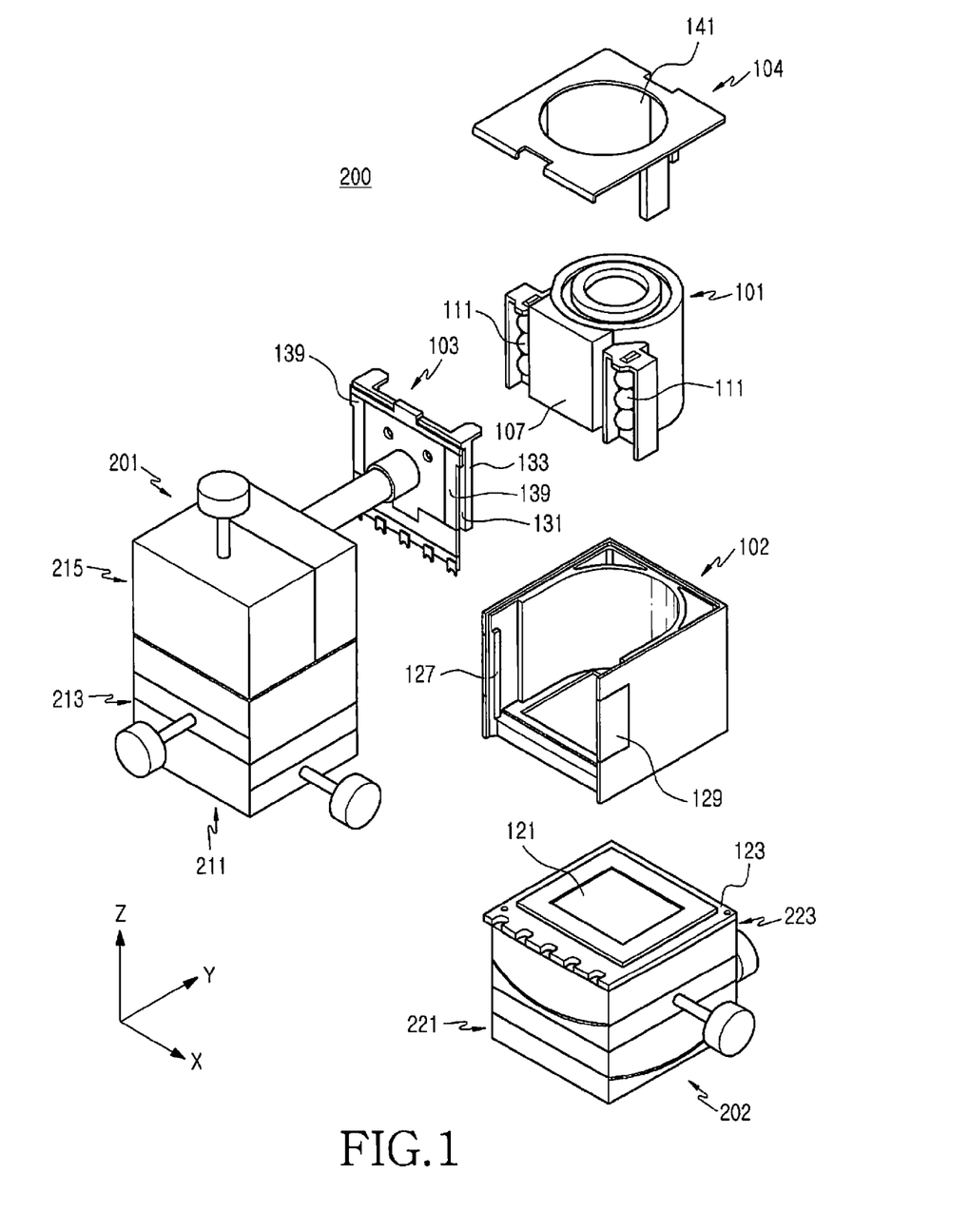
FIG. 1 is a diagram illustrating an exploded perspective view of a lens assembly alignment device for a camera lens module, according to an embodiment of the present invention.
Figure 2:
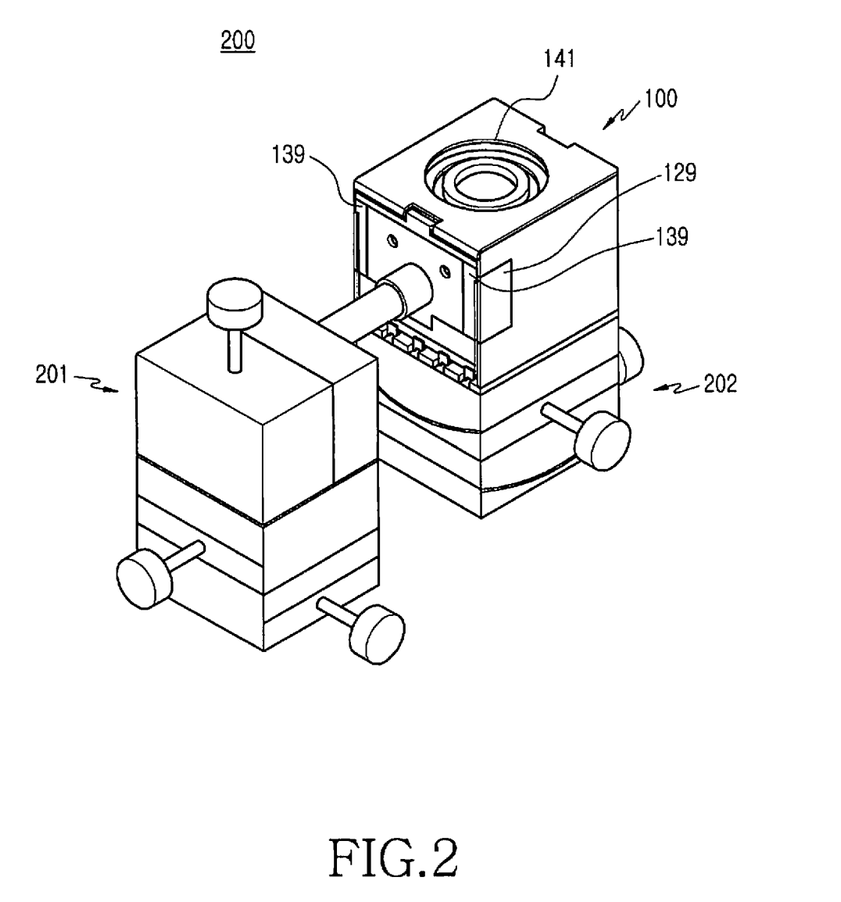
FIG. 2 is a diagram illustrating an operational view of the lens assembly alignment device shown in FIG. 1, according to an embodiment of the present invention.
Figure 6:
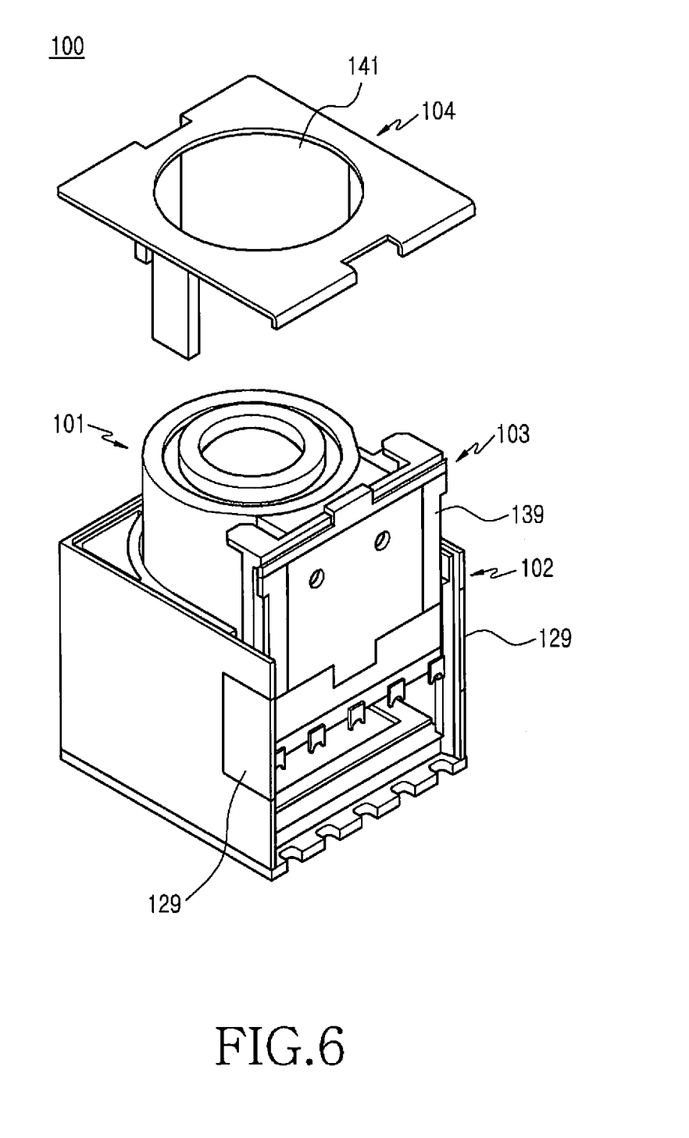
FIG. 6 is a diagram illustrating a perspective view of the camera lens module of FIG. 1 before it is assembled, according to an embodiment of the present invention.
Figure 7:
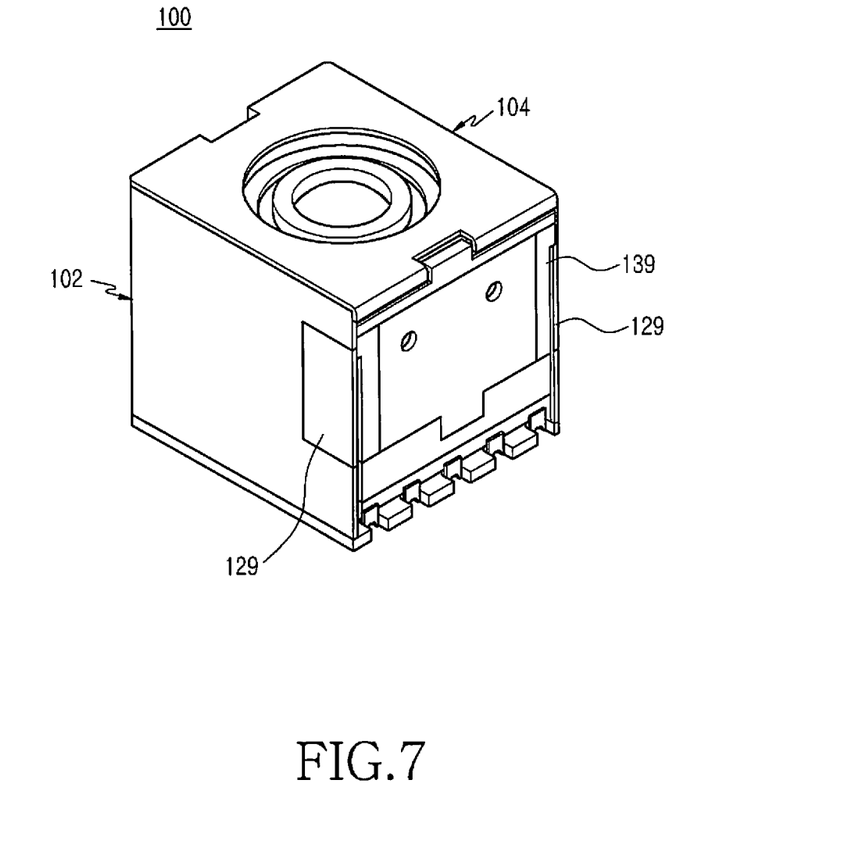
FIG. 7 is a diagram illustrating a perspective view of the camera lens module of FIG. 1 after it is assembled, according to an embodiment of the present invention.

FIGS. 6 and 7 show the camera lens module 100 of FIG. 1 before and after it is assembled. As shown in FIGS. 6 and 7, the camera lens module 100 is constructed to receive the lens assembly in the housing 102. The lens assembly consists of a body tube 101 and a guide unit 103. The housing 102 is provided with a circuit board, on which an image sensor 121 is mounted (See FIG. 1), and a cover 104 is mounted on the housing 102 so as to protect the lens assembly.

The body tube 101 includes at least one lens. During photographing, the body tube 101 is guided by the guide unit 103 according to user manipulation, thereby being linearly moved in a direction along the optical axis of the lens.

Referring again to FIGS. 1-5, the housing 102 is received in the body tube 101 in a linearly movable state, and the image sensor 121 and a circuit board 123 are installed in the housing 102 in a state in which the optical axis of the image sensor 121 conforms to that of the lens assembly. The inventive lens assembly device 200 conforms the optical axes of the image sensor 121 and the lens assembly to one another.

The image sensor 121 is opposed to the body tube 101 received in the housing 102, and detects an image of an object incident through the body tube 101. Specifically, it detects an image through the lens and converts the image into an electrical signal.

The image sensor 121 is mounted on the circuit board 123, which transmits an image signal converted by the image sensor 121 to other components, e.g., a central processing unit of a portable terminal.

One side of the housing 102 is open, and the guide unit 103 is engaged in the open side of the housing 102, thereby partially closing the open portion of the housing 102. The housing 102 has a pair of fastening ribs 127 which are formed adjacent to the open side and protrude opposite to each other. The fastening ribs 127 extend parallel to the optical axis of the lens assembly. By being assembled to the housing 102, the guide unit 103 retains the body tube 101 received in the housing 102. Additionally, the opposite lateral edges of the guide unit 103 are formed with fastening grooves 131 formed for engagement with the fastening ribs 127. Specifically, the fastening grooves 131 are recessed from the opposite lateral edges of the guide unit 103, so that the fastening ribs 127 can be fit in the fastening grooves 131. By fitting the fastening ribs 127 in the fastening grooves 131, the guide unit 103 is assembled to the housing 102. The fastening ribs 127 are smaller than the fastening grooves 131, so that the guide unit 103 is movable in relation to the housing 102. Consequently, the position adjustment of the optical axis of the lens assembly and the adjustment of the slant between the optical axes of the image sensor 121 and the lens assembly can be executed. However, if the alignment of optical axes of the lens and image sensor 121 is completed, the guide unit 103 is fixed to the housing 102 using the welding unit.

The body tube 101 is engaged with and guided by the guide unit 103 in such a manner that the body tube 101 is linearly moved in a direction along the optical axis of the lens within the housing 102. A plurality of metal balls 111 and a magnetic body 107 are provided in the body tube 101 in order to enable smooth linear movement. The guide unit 103 is provided with a reception part 133 for receiving the metal balls 111. This construction provides a driving force for automatic focal adjustment of the camera module, and smoothes the focal adjustment operation.

The cover 104 is joined to the housing 102 so as to maintain the body tube 101 received in the housing 102. The cover 104 is formed with an opening 141 for providing an object image incident path, so that the object image is formed on the image sensor 121 via the opening 141 and the body tube 101.

The lens assembly alignment apparatus 200 aligns and fixes the guide unit 103 to the housing 102 at a position where the optical axes of the image sensor 121 and the lens assembly conform to each other.

The position alignment apparatus 201 aligns the position of the optical axis of the lens assembly to the optical axis of the image sensor 121. The position alignment apparatus 201 moves the lens assembly horizontally in relation to the image sensor 121 in the direction of the optical axis of the lens assembly or on a plane perpendicular to the optical axis of the lens assembly. As the position alignment apparatus 201 moves the lens assembly, the optical axis of the lens assembly crosses the optical axis of the image sensor on the image forming plane of the image sensor 121.

If the optical axis of the lens assembly crosses the optical axis of the image sensor 121 on the image forming plane when, for example, the optical axes of the lens assembly and the image sensor 121 are obliquely arranged in relation to each other, the position of the image formed through the image sensor 121 is changed when the body tube 101 moves in the direction of the optical axis. Specifically, if the optical axes of the image sensor 121 and the lens assembly are obliquely arranged in relation to each other, the optical axis of the lens assembly will move to another position on the image forming plane of the image sensor 121 when the body tube moves in the direction of the optical axis. Therefore, by adjusting the slant angle of the image sensor 121 in relation to the lens assembly using the slant alignment apparatus 202, the optical axes of the image sensor 121 and the lens assembly will conform to each other.

The lens assembly is moved in two directions which are perpendicular to each other, and in the direction of the optical axis on a plane perpendicular to the direction of the optical axis by the position alignment apparatus 201. The two directions perpendicular to each other on the plane perpendicular to the optical axis is referred to as first and second directions (X, Y), respectively, and the direction of the optical axis of the lens assembly is referred to as a third direction (Z).

Figure 3:
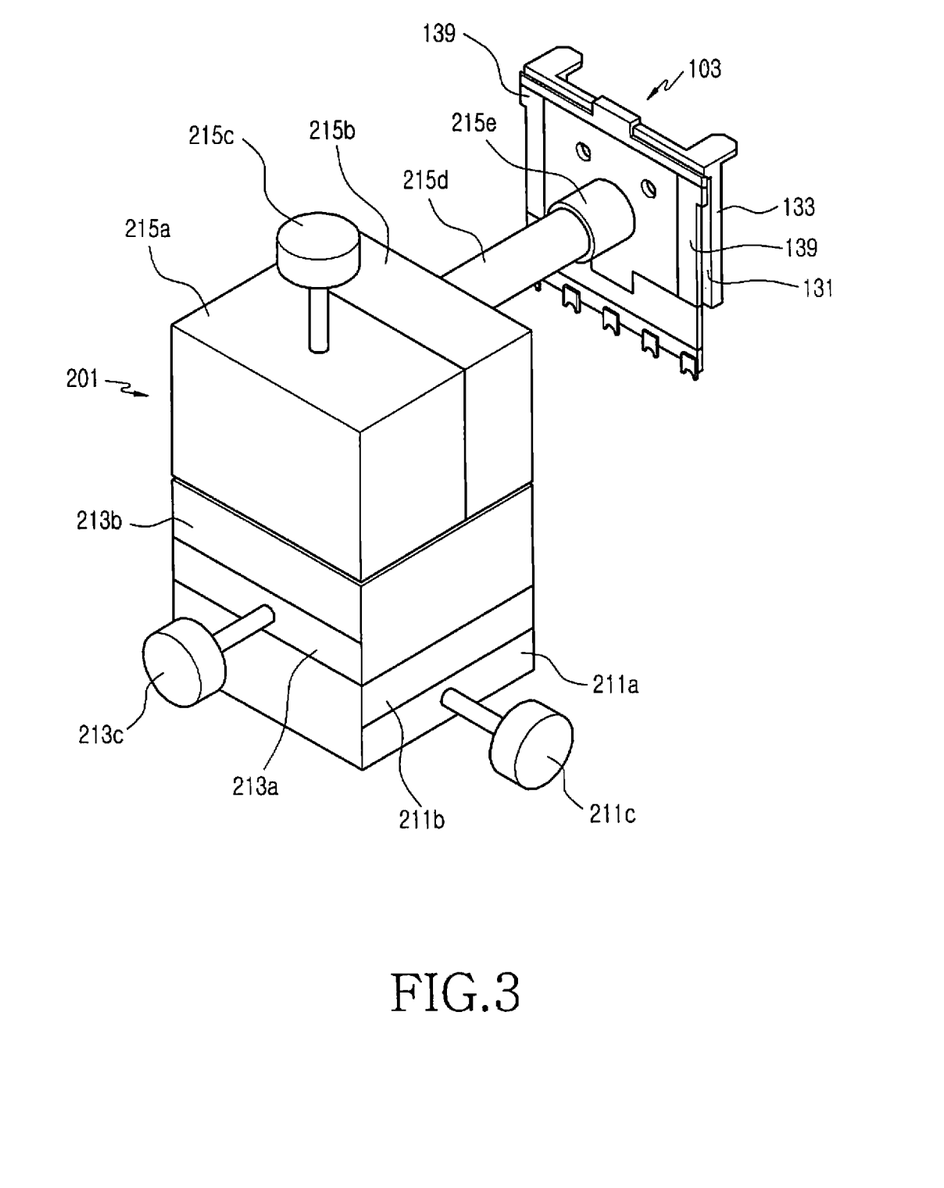
FIG. 3 is a diagram illustrating a perspective view of a position alignment apparatus in the lens assembly alignment device shown in FIG. 1, according to an embodiment of the present invention.
Figure 4:
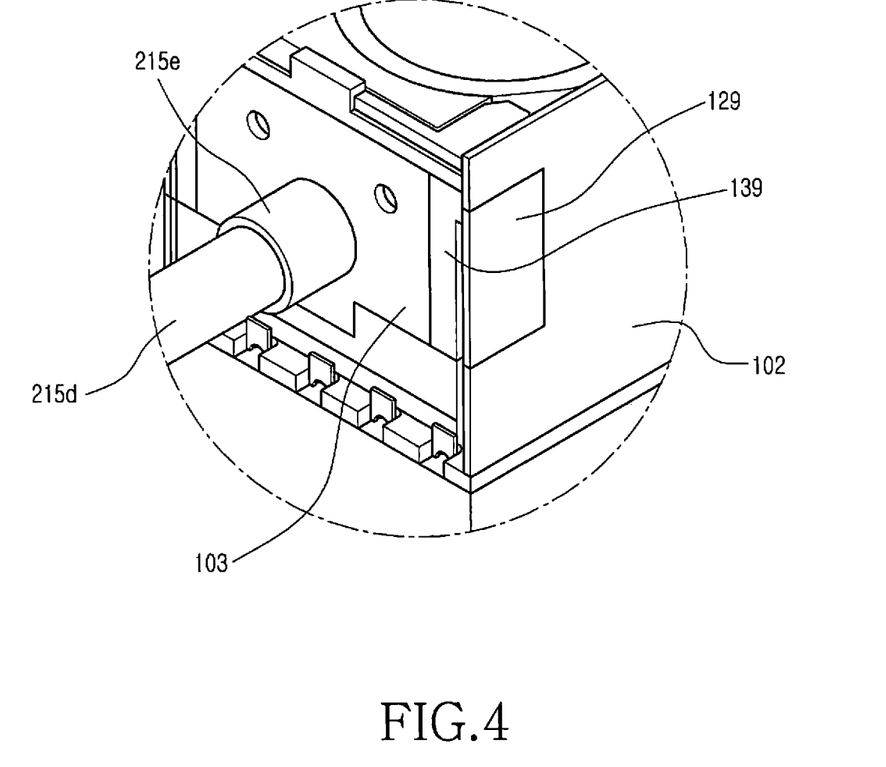
FIG. 4 is a diagram illustrating an enlarged perspective view of a part of the position alignment apparatus shown in FIG. 3, according to an embodiment of the present invention.

Referring to FIGS. 3 and 4, the position alignment apparatus 201 includes first, second and third alignment devices 211, 213 and 215 for moving the lens assembly in the first, second and third directions (X, Y, Z), respectively. Each of the alignment devices 211, 213 and 215 includes a base 211a, 213a or 215a, and a movable unit 211b, 213b or 215b. Each of the bases 211a, 213a and 215a is provided with a control handle 211c, 213c or 215c, so that each of the movable units move on the corresponding base as the corresponding control handle is manipulated.

The movable units will be moved along the first, second and third directions (X, Y, Z), respectively. Each of the bases, movable units and control handles may be configured according to a micrometer principle, which is a kind of a measuring instrument. The base 213a of the second alignment device 213 is mounted on the movable unit 211b of the first alignment device 211. The base 215a of the third alignment device 215 is mounted on the movable unit 213b of the second alignment device. The movable unit 215b of the third alignment device 215 is provided with a mounting arm 215d, on which the guide unit 103 is mounted. As a result, the guide unit 103 may be moved in any of the first, second and third directions (X, Y, Z) by the position alignment apparatus 201 in the state in which it is assembled to the body tube 101.

The guide unit 103 is provided with a yoke 139, and the mounting arm is provided with a magnetic body 215e, so that the guide unit 103 can be attached to the mounting arm 215d. Alternatively, a separate holder or the like may be provided on the guide unit 103, so that the guide unit 103 can be attached to the mounting arm 215d. Additionally, an operator may manipulate the control handles 211c, 213c and 215c directly or a servo motor, a step motor, etc., to adjust the position of the optical axis of the lens assembly.

Figure 5:
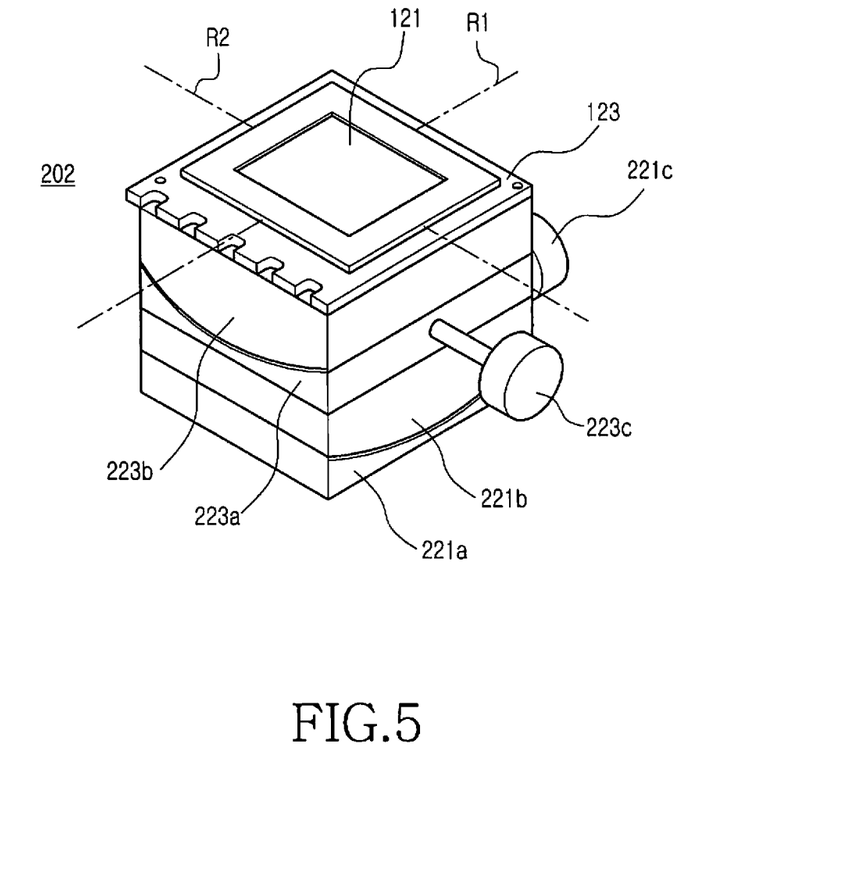
FIG. 5 is a diagram illustrating a perspective view of a slant alignment apparatus in the lens assembly alignment device shown in FIG. 1, according to an embodiment of the present invention.

Referring to FIG. 5, the slant alignment apparatus 202 includes a first slant alignment device 221, and a second slant alignment device 223. Although the first and second alignment devices 221 and 223 are similar to the alignment devices of the position alignment apparatus 201, there is a difference in that a structure corresponding to the movable unit rotates about first and second rotary axes R1 and R2 as control handles 221c and 223c are manipulated. Therefore, in describing the slant alignment apparatus, the structure corresponding to the movable unit will be referred to as a rotatable member.

The first slant alignment device 221 includes a first fixed member 221a which has a first guide surface in the shape of a circular arc having a first curvature, and a first rotatable member 221b mounted on the fixed member 221a and sliding along the first guide surface. As the slant control handle 221c installed in the first fixed member 221a is manipulated, the first rotatable member 221b is guided and moved along the first guide surface. The peripheral surface of the first rotatable member 221b is formed in a curved shape corresponding to the first guide surface. The first rotatable member 221b rotates about the first rotary axis R1. The first rotary axis R1 extends along the second direction Y and is positioned on the image forming plane of the image sensor 121 when the housing 102, more specifically the image sensor 121 and the circuit board 123, are arranged in the slant alignment apparatus 202. Consequently, the distance from the first rotary axis R1 to the first guide surface corresponds to the radius of the circular arc of the first guide surface.

The second slant alignment device 223 includes a second fixed member 223a having a second guide surface in the shape of a circular arc having a second curvature, and a second rotatable member 223b mounted on the second fixed member 223a and sliding along the second guide surface. As the slant control handle 223c installed to the first fixed member 223a is manipulated, the second rotatable member 223b is guided and moved along the second guide surface. The peripheral surface of the first rotatable member 223 is formed in a curved shape corresponding to the second guide surface. The second rotatable member 223b rotates about the second rotary axis R2. The second rotary axis R2 extends along the first direction X and is positioned on the image forming plane of the image sensor 121 when the housing 102, more specifically the image sensor 121 and the circuit board 123, are arranged in the slant alignment apparatus 202. Consequently, the first and second rotary axes R1 and R2 are positioned on the image forming plane of the image sensor 121 and extend perpendicular to each other. The distance from the second rotary axis R2 to the second guide surface corresponds to the radius of the circular arc of the second guide surface.

When the circuit board 123 is located on the second rotatable member 223b, the optical axis of the image sensor 121 can be aligned parallel to the optical axis of the lens assembly using the first and second slant alignment devices 221 and 223.

Consequently, by rendering the optical axes of the lens assembly and the image sensor 121 to cross each other on the image forming plane of the image sensor with the position alignment apparatus 201, and by rendering the optical axis of the image sensor 121 to be arranged parallel to the optical axis of the lens assembly with the slant alignment apparatus 202, the optical axes of the lens assembly and the image sensor 121 can conform to each other.

As described above, the fastening grooves 131 are formed larger than the fastening ribs 127. This provides a movement space for the lens assembly in relation to the housing 101 in the process of position alignment and slant alignment as described above. Since the manufacturing and assembling tolerances of individual components of the camera lens module are typically controlled in the range of several to several tens of micrometers (μm), the fastening grooves 131 and the fastening ribs 127 are preferably formed in such a manner that the inner walls of each of the fastening grooves 131 can be spaced by a maximum of several tens of micrometers from the opposite lateral surfaces of the corresponding fastening rib 127. It is desired to properly set the size of such a gap according to the practical size of a product, the tolerances required for the product, etc.

When the optical axes of the lens assembly and the image sensor 121 conform to each other, the position alignment apparatus 201 executes initial focal adjustment of the camera lens module 100. The initial focal adjustment arranges the distance between the image sensor 121 and the lens assembly to correspond to a focal length set in the lens system of the lens assembly when the lens module 100 is initialized. This will be implemented using the third alignment device 215 of the position alignment apparatus 201.

The position adjustment of the optical axis of the lens assembly with the position alignment apparatus 201 moves the body tube 101 together with the guide unit 103. The adjustment of focal length at the time of practical photographing is executed by the movement of the body tube 101 along the direction of the optical axis of the lens assembly.

As described above, the guide unit 103 is fixed to the housing 102 using a welding unit after the alignment of the optical axes of the lens assembly and the image sensor 121 is completed. Additionally, the guide unit 103 is assembled to the housing 102 with the opposite lateral edges of the guide unit 103 engaged with the housing 102. In order to allow the welding, the yokes 139 extend to the opposite lateral edges of the guide unit 103, respectively, and metal sheets 129 are mounted on the housing 102. The yokes 139 and the metal sheets 129 are positioned adjacent to each other for welding. After the alignment of optical axes and the initial focal adjustment are completed, the yokes 139 and the metal sheets 129 are welded using a laser welder, for example. Spot welding is preferably performed at two or more points on the opposite lateral edges of the guide unit 103.

As described above, the inventive lens assembly alignment apparatus completes initial focal adjustment as well as position adjustment of optical axes and slant in the course of assembling a lens assembly with an image sensor. The optical axes can be easily aligned to each other in the course of assembling a camera lens module, and the performance of individual optical elements can be optimized in the completed camera lens module.

The inventive lens assembly alignment apparatus for a camera lens module easily conforms individual optical axes to each other by adjusting the positions and slants of optical elements of a camera lens module. Since the alignment of optical axes can be easily executed between the individual optical elements of the camera lens module, the performance of the individual optical elements can be optimized, which contributes to improved quality of images photographed through the camera lens module.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A lens assembly alignment apparatus for a camera lens module comprising:
    a position alignment apparatus that moves a lens assembly in a direction of an optical axis of the lens assembly and on a plane perpendicular to the optical axis of the lens assembly; and
    a slant alignment apparatus having first and second rotary axes that extend perpendicular to each other and perpendicular to the optical axis of the lens assembly, respectively, wherein the lens assembly is received in a housing, and the slant alignment apparatus aligns an optical axis of an image sensor, which is mounted in the housing, parallel to the optical axis of the lens assembly by rotating the housing about each of the first and second rotary axes;
    wherein the lens assembly includes a body tube within which a plurality of lenses are mounted, and a guide unit for linearly moving the body tube in the direction of the optical axis of the lens assembly, wherein the guide unit is fixed to the housing; and
    wherein the camera lens module has one or more yokes mounted on the guide unit, and one or more metal sheets mounted on the housing.

2. The apparatus as claimed in claim 1, wherein the camera lens module has at least one fastening rib formed on the housing, and at least one fastening groove formed on the guide unit that engages the at least one fastening rib, wherein the at least one fastening groove is formed wider than the at least one fastening rib, thereby providing a space for moving the guide unit in relation to the housing when the position alignment apparatus and the slant alignment apparatus are driven.

3. The apparatus as claimed in claim 1, wherein the housing engages opposite lateral edges of the guide unit, and the one or more metal sheets are disposed adjacent to the opposite lateral edges.

4. The apparatus as claimed in claim 3, wherein welding is performed at two or more points in the opposite lateral edges of the guide unit.

5. The apparatus as claimed in claim 1, wherein the slant alignment apparatus comprises:
    a first fixed member with a first guide surface having a circular arc shape with a first curvature;
    a first rotatable member mounted on the first fixed member and slidable along the first guide surface;
    a second fixed member with a second guide surface having a circular arc shape with a second curvature, wherein the second fixed member is fixed to the first rotatable member; and
    a second rotatable member mounted on the second fixed member and slidable along the second guide surface, wherein the image sensor is mounted on the second rotatable member, and the first and second rotary axes are positioned on an image forming plane of the image sensor.

6. The apparatus as claimed in claim 5, wherein the first rotatable member rotates about the first rotary axis while sliding along the first guide surface, and the second rotatable member rotates about the second rotary axis while sliding along the second guide surface.

7. The apparatus as claimed in claim 5, wherein the first and second rotatable members have curved peripheral surfaces which correspond to the first and second guide surfaces, respectively.

* * * * *